US012266182B2

(12) United States Patent
Dalley, Jr. et al.

(10) Patent No.: US 12,266,182 B2
(45) Date of Patent: Apr. 1, 2025

(54) OFFICER SAFETY USING COMPUTER VISION

(71) Applicant: Codex Corporation, Maple Grove, MN (US)

(72) Inventors: Kenneth L. Dalley, Jr., Maple Grove, MN (US); Sriram Yechangunja, Maple Grove, MN (US); Andrew Shaw, Maple Grove, MN (US); Gareth Miller, Roseville, MN (US)

(73) Assignee: Codex Corporation, Maple Grove, MN (US)

( * ) Notice: Subject to any disclaimer, the term of this patent is extended or adjusted under 35 U.S.C. 154(b) by 356 days.

(21) Appl. No.: 17/691,328

(22) Filed: Mar. 10, 2022

(65) Prior Publication Data
US 2023/0027643 A1 Jan. 26, 2023

Related U.S. Application Data

(60) Provisional application No. 63/225,167, filed on Jul. 23, 2021.

(51) Int. Cl.
*G06V 20/52* (2022.01)
*G06Q 50/26* (2012.01)
(Continued)

(52) U.S. Cl.
CPC .......... *G06V 20/52* (2022.01); *G06Q 50/265* (2013.01); *G06V 20/44* (2022.01); *G06V 20/64* (2022.01); *G08B 27/005* (2013.01)

(58) Field of Classification Search
CPC ........ G06V 20/52; G06V 20/44; G06V 20/64; G06V 10/82; G06V 40/172; G06V 20/20; G06V 30/413; G06V 40/171; G06V 10/764; G06V 40/20; G06V 10/50; G06V 40/18; G06V 40/19; G06V 40/193; G06V 40/197; G06V 10/761; G06V 20/00;
(Continued)

(56) References Cited

U.S. PATENT DOCUMENTS 10,515,243 B1 * 12/2019 Ray .................. G08B 21/22
2010/0039247 A1 * 2/2010 Ziegler ................ G07C 3/00
340/436

(Continued)

*Primary Examiner* — Nimesh Patel
(74) *Attorney, Agent, or Firm* — Schwegman Lundberg & Woessner, P.A.

(57) ABSTRACT

The disclosure relates improving correctional officer safety. A system can include a first camera facing a region of a correctional facility including monitored objects, the first camera configured to generate first pixel data including first pixels corresponding to the objects, a second camera in the correctional facility and facing away from the region, the second camera configured to generate second pixel data including second pixels corresponding to a person that approaches the region, and a server configured to receive the first and second pixel data through a network connection, transmit the received data to a recognition service through the network, and receive an alert from the alert service that indicates a monitoring rule associated with an object of the objects is violated, an identification associated with the person, a last known location of the person or the object, and an indication of the monitoring rule violated.

20 Claims, 11 Drawing Sheets

(51) Int. Cl.
*G06V 20/40* (2022.01)
*G06V 20/64* (2022.01)
*G08B 27/00* (2006.01)

(58) Field of Classification Search
CPC ............. G06V 30/19093; G06V 40/10; G06V 10/143; G06V 40/174; G06V 10/245; G06V 20/66; G06V 30/10; G06V 20/41; G06V 2201/07; G06V 40/161; G06V 20/695; G06V 40/28; G06Q 50/265; G08B 27/005; G08B 13/19613; G08B 13/19608; G08B 13/19645; G08B 21/24; G08B 13/19643; G08B 13/19663; G08B 13/19602; G08B 13/19697; G08B 13/1966; G08B 13/19684; G08B 21/0476; G08B 25/00; G08B 13/1436; G08B 13/1427; G08B 13/19693; G08B 13/19695; G08B 21/0247; G08B 17/00; G08B 21/0277; G08B 21/245; G08B 25/08; G08B 13/19689; G08B 21/22; G08B 25/008; G06T 7/20; G06T 19/006; G06T 7/70; G06T 2207/30201; G06T 2207/30232; G06T 2207/10016; G06T 2207/30196; G06T 2207/30242; G06T 7/11; G06T 7/194; G06T 19/00; G06T 7/248; G06T 7/292; G06T 7/73; G06T 11/00; G06T 19/003; G06T 2207/10048; G06T 2207/20081; G06T 2207/20084; G06T 2207/20092; G06T 2207/30261; G06T 5/50; G06T 7/215; G06T 2207/30088; G06T 7/0016; G06T 7/30; G06T 7/593; G06T 17/05; G06F 21/32; G06F 18/22; G06F 18/2148; G06F 18/24; G06F 16/29; G06F 16/951; G06F 21/31; G06F 2203/011; G06F 3/012; G06F 3/017; G06F 3/013; G06F 21/33; G06F 21/606; G06F 21/6245; G06F 21/6236; G06F 16/2358; G06F 21/53; G06F 21/57; G06F 16/906; G06F 16/9538; G06F 2221/2113; G07C 9/37; G07C 2009/00769; G07C 9/00896; G07C 9/27; G07C 1/10; G07C 1/32; G07C 9/00309; G07C 9/00571

See application file for complete search history.

(56) References Cited

U.S. PATENT DOCUMENTS

| | | | |
|---|---|---|---|
| 2016/0217345 A1* | 7/2016 | Appel | G06T 7/20 |
| 2018/0300555 A1* | 10/2018 | Hodge | G06V 40/20 |
| 2019/0354753 A1* | 11/2019 | Worrall | G06V 40/20 |
| 2020/0125838 A1* | 4/2020 | Dalley, Jr. | H04N 23/617 |

* cited by examiner

OFFICER SAFETY USING COMPUTER VISION

RELATED APPLICATION

This application is related and claims priority to U.S. Provisional Patent Application Ser. No. 63/225,167 that was filed on Jul. 23, 2021.

BACKGROUND INFORMATION

Correctional officers have the highest rates of nonfatal, work-related injuries of any worker in the United States. There are about a half million correctional officers (COs) managing nearly two million inmates. COs experience over 250 work-related injuries per 10,000 full-time employees, mostly by assaults and violent acts.

Most of these assaults are perpetrated by inmates using common objects that can be converted into weapons of opportunity. Items issued to inmates were the most common source of materials used as weapons to injure staff.

DETAILED DESCRIPTION

Figure 1:
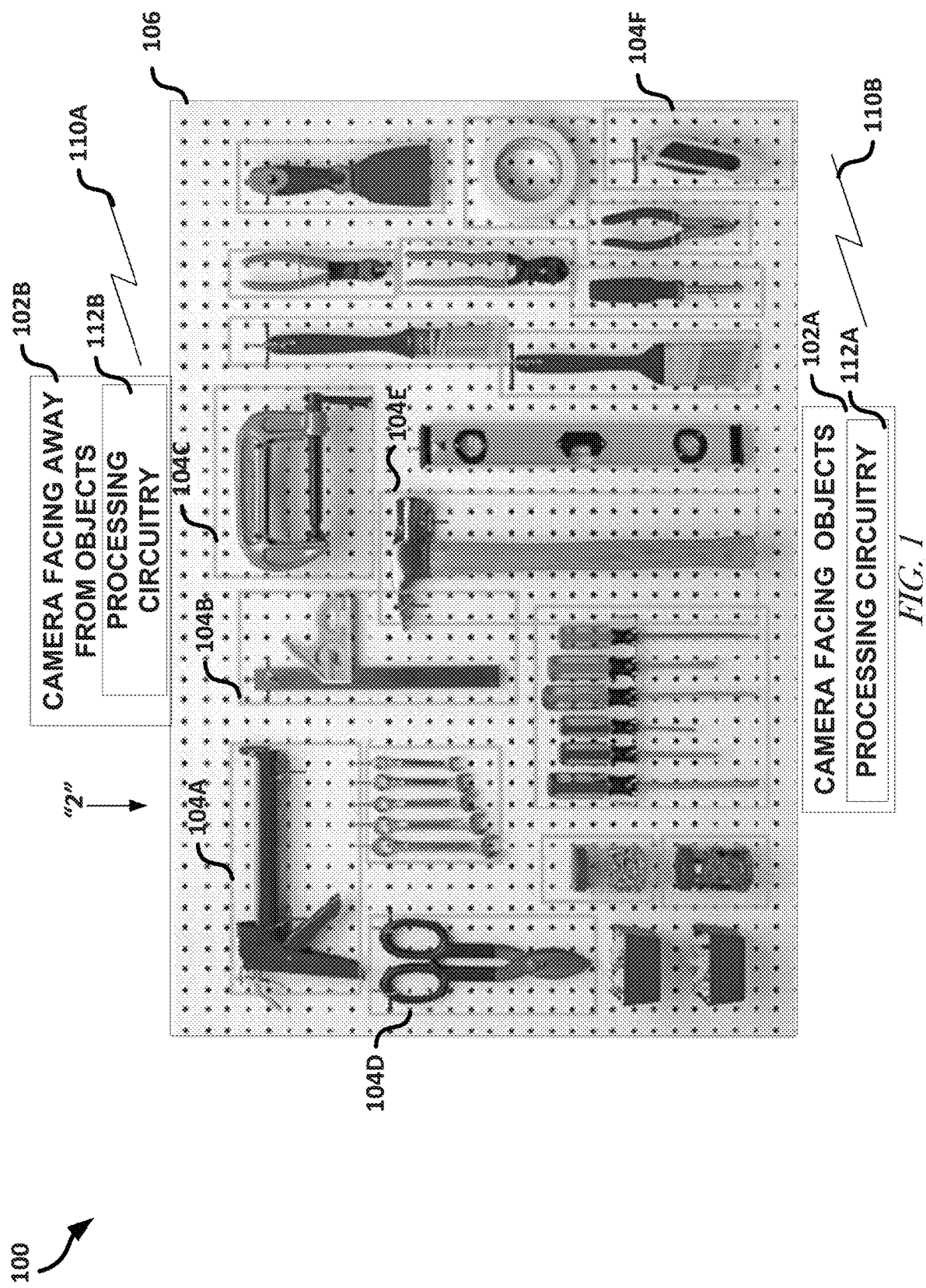
FIG. 1 illustrates, by way of example, a diagram of an embodiment of a system for object management.

Various embodiments illustrated and described herein provide solutions to efficiently and accurately monitor the whereabouts of objects in a secure facility, such as a jail, prison, or other correctional facility or detention facility. Embodiments can help reduce correctional officer (CO) injuries (e.g., life threatening and non-life threatening injuries). Embodiments can help automate the monitoring of objects in the facility. For example, tools and other implements that may be used or modified for use as weapons are monitored in some embodiments herein for their presence, absence, and return with imaging devices and image processing. These advantages and embodiments are described, with reference to the FIGS.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the subject matter of embodiments.

Such embodiments may be referred to, individually and/or collectively, herein by the term example or embodiment merely for convenience and without intending to limit the scope of this application to any single concept if more than one is in fact disclosed. The following description is, therefore, not to be taken in a limited sense, and the scope of inventive subject matter is defined by the appended claims.

In 2017, four correctional officers were murdered in an attempted escape by four inmates in North Carolina. The escape plan was developed three months prior to the day of the attack. The plan included stealing objects from the facility including a claw hammer, scissors, and other tools, including a spear made out of a wooden broom handle metal from a shelving unit in the prison industries' warehouse. Given this, a solution to curbing inmate-on-staff (or inmate-on-inmate) violence is to provide better vigilance when it comes to issuance, possession, and tracking of objects issued or accessible to inmates. The object can be retrofitted as a weapon or used as a blunt force instrument to cause seriously bodily harm or death. But such retrofitting or use can be predicted or thwarted with better object management capabilities.

One solution to managing object location relative to incarcerated persons is to have a correctional officer manage an object log. The object log can include manual entries indicating when an incarcerated person has checked out an item, checked in the item (if it is checked in), corresponding times of check out or check-in, or the like. A correctional officer or other personnel consulting the log can then determine whether an object is where it should be or to whom an item was last checked out. Such a log is prone to human error and to forgery. An incarcerated person can forge that the item was checked in or a correctional officer can forget to record that an item was checked out.

Another solution includes placing active or passive radio frequency identification (RFID) tags on the objects and locating corresponding RFID readers that can detect when an item is checked out, checked in, or the like. The reads made by the RFID readers can be used to determine if an object is missing, present, or the like. However, passive RFID can be bypassed simply by maintaining a distance between an RFID chip on the object and the RFID reader. Further, an active RFID chip can be difficult to place on some objects, such as a wire nut, screwdriver, or other objects that can be accessible in a correctional facility.

Embodiments can use computer vision to 1. Identify objects (e.g., in real-time); 2. Identify the person that takes an object, or a combination thereof. The computer vision results can be used to notify one or more users when an object is not returned, or an object taking violates a policy associated with the object.

The disclosure presents methods and apparatuses for monitoring correctional facility personnel, objects, or a combination thereof using facial, object, feature, or other computer vision based recognition. The correctional facility personnel can include an employee of the correctional facility (e.g., a corrections officer, warden, cook, nurse, janitor, maintenance personnel, information technology (IT) manager, maid, or the like), a person detained in the correctional facility (sometimes called an "inmate" or "incarcerated person" herein), a person visiting the correctional facility (e.g., inmate friend or relative), lawyer, religious figure (e.g., minister, pastor, rabbi, or the like), or other correctional facility visitor.

The feature, facial, or object recognition can include one or more characteristics unique to the correctional facility personnel. For example, facial features, tattoo, birthmark, hairdo, or characteristic of a visible body part (visible to the camera). The body part can include a hand, neck, or other visible body part.

A camera can include a field of view that includes a portion of a correctional facility. The camera can produce frames that include pixel data. The frames can be provided to a local or remote device that analyzes the pixel data. The analysis can include performing object recognition, facial recognition, or the like to identify an entity associated with the object or face. The identification can include comparing one or more features from the analysis to records of features of correctional facility personnel to determine an entity associated with the features.

The field of view of the camera can be static and the data from the camera can include data or metadata that indicates the camera from which the pixel data originated. In such cases, the field of view of the camera can be associated with a location in the correctional facility and a location of the entity identified in the analysis can be determined.

The field of view of a camera can be dynamic, such as if the camera is mobile. A mobile camera can be on a track, wire, part of a person, or carried by a person. In such cases, a location of the camera can be determined based on an object in the field of the camera. The object can be static in the correctional facility and associated with a location in the correctional facility. When correctional facility personnel are identified in the pixel data with the object, it can be determined that the identified correctional facility personnel is at the location associated with the object.

The frame from the camera can include an associated time or date. The time or date can be compared against a schedule for the correctional facility personnel. If the location of the personnel is not consistent with the schedule, an alert can be triggered. Regardless of whether the location is consistent with the schedule, an indication of the location of the identified personnel can be provided to correctional facility personnel.

In this way, managing information about an incarcerated person or an item can be automatically maintained and updated. Such a system can be advantageous when implemented in a detention center, incarceration facility, mental health facility, or any other place where location information about people or objects can be automatically tracked and managed.

Secure facility agencies face logistical, communication, and records management challenges when managing incarcerated persons (e.g., incarcerated persons). This includes processing, providing care, feeding, and collecting a wide range of information about each of the incarcerated persons including a direction the incarcerated person is moving or a location of the incarcerated person. Various embodiments illustrated and described herein include systems, methods, and software to assist in such situations. For example, typical embodiments assist in rapid recording and monitoring a wide range of data about incarcerated persons including position of the incarcerated person at a given scan time and direction the incarcerated person was traveling at a given detection time. One or more embodiments may do so in a user-friendly and efficient manner via a networked computing environment.

Custodians of persons in a facility manage many responsibilities including a significant amount of documentation in order to capture data pertinent to each person they are responsible for. Custodians (e.g., secure facility officers) may face challenges in managing persons in their facilities, such as tracking location of items. To help mitigate such risks, some embodiments herein include systems, methods, and software that provide automated data documentation indicating a location or other information associated with an item.

These and other advantages can be realized using one or more embodiments disclosed herein. The systems, methods, devices, and machine-readable media are now described in more detail with reference to the drawings. In the FIGS., like numerals with different suffixes indicate different instances of a similar item. For example, 102A can refer to a specific instance of item 102 and 102B refers to a different instance of the item 102.

FIG. 1 illustrates, by way of example, a diagram of an embodiment of a system 100 for object management. The system 100 as illustrated includes cameras 102A, 102B, and objects 104A, 104B, 104C, 104D, 104E, 104F in a region 106. The region 106 can include a location within a correctional facility. The objects 104A-104F can be on a pegboard (as illustrated in FIG. 1), a cart, wall, or other retaining mechanism.

The cameras 102A-102B can be mobile or fixed in the area in which they are deployed. An example of a camera 102 includes a wall-mounted camera with a stationary field of view. Such a camera 102 captures image data (pixel values) of items in the field of view of the camera 102. In the example of FIG. 1, the cameras 102A-102B are fixed cameras with static fields of view. The cameras 102A-102B can be assigned respective names (e.g., a collection of characters, letters, numbers, or other symbols) to uniquely identify the camera 102A-102B.

The cameras 102A-102B can each be assigned to a specific location. In the example, of FIG. 1, the cameras 102A-102B can be assigned to the same location. The location of the camera 102A-102B can be configured such that the cameras 102A-102B, in aggregate, can monitor a substantial portion of the objects 104 in the area in which they are deployed. The location of camera 102 can be determined through global positioning systems (GPS) software on the camera 102, a location code stored in a database (e.g., database 338), or other location software services capable of verifying the location of the camera 102.

In one or more embodiments, the cameras 102A-F can be configured to provide data within a field of view thereof. The data from the camera 102A-102B can include a unique identifier corresponding to that camera 102A-102B.

The cameras 102A-102F can each be assigned to a specific customer (e.g., an entity interested in using an object monitoring system). Such an assignment can help a data center manage information received from the camera 102. The camera 102A-102B can be connected to a server 334 or a network 346 (see FIG. 3) through a wired or wireless connection 110A, 110B, respectively. A wired connection can include an Ethernet connection or other protocol operable to connect the cameras 102A-102B to the server 334 or network 346. A wireless connection can include Wi-Fi, Bluetooth, Zigbee, or other protocol operable to wirelessly connect the cameras 102A-102B to the server 334 or network 346.

The camera 102A can be positioned such that the region 106 is within the a field of view (FOV) of the camera 102A. The camera 102B can be positioned to face away from the region 106. The camera 102B can be positioned to capture image data of a region in front of the region 106 (see FIG. 2). The camera 102A can face the camera 102B and be within the FOV of the camera 102B, and vice versa, but this is not required. The camera 102B can be positioned to capture image data of a person 220 that approaches the objects 104A-104F. The person 220 can include a correctional officer, incarcerated person, or other person in the correctional facility.

The image data from the cameras 102A-102B can be leveraged to monitor objects 104 and there locations. An alert can be generated responsive to an unexpected missing object. The alert can be provided to correctional facility personnel. The correctional facility personnel can then act, based on information from the system 100, to retrieve the object 104 and help ensure the safety of persons within the correctional facility.

Each of the cameras 112A, 112B includes respective processing circuitry 112A, 112B. The processing circuitry 112A, 112B can process, partially process, or just transmit without processing, image data from the camera 102A, 102B, respectively. Cameras 102 generally have varying levels of data processing capabilities. One camera can simply generate pixel data and store that data to a memory device, another camera can generate the pixel data, encode/compress the data, and transmit the data, yet another camera can generate the pixel data, analyze the pixel data, and communicate a result or perform another operation based on the analysis. The processing circuitry 112A, 112B can thus be different for different cameras 102.

The processing circuitry 112A, 112B can include electric or electronic components configured to perform operations of the camera 102A, 102B, respectively. The electric or electronic components can include one or more transistors, resistors, capacitors, diodes, inductors, switches, oscillators, logic gates (e.g., AND, OR, XOR, negate, buffer, or the like), multiplexers, memory devices, amplifiers, digital to analog converters, analog to digital converters, power supplies, processing units (e.g., field programmable gate arrays (FPGAs), application specific integrated circuits (ASICs), central processing units (CPUs), graphics processing units (GPUs), or the like), or a combination thereof.

Figure 2:
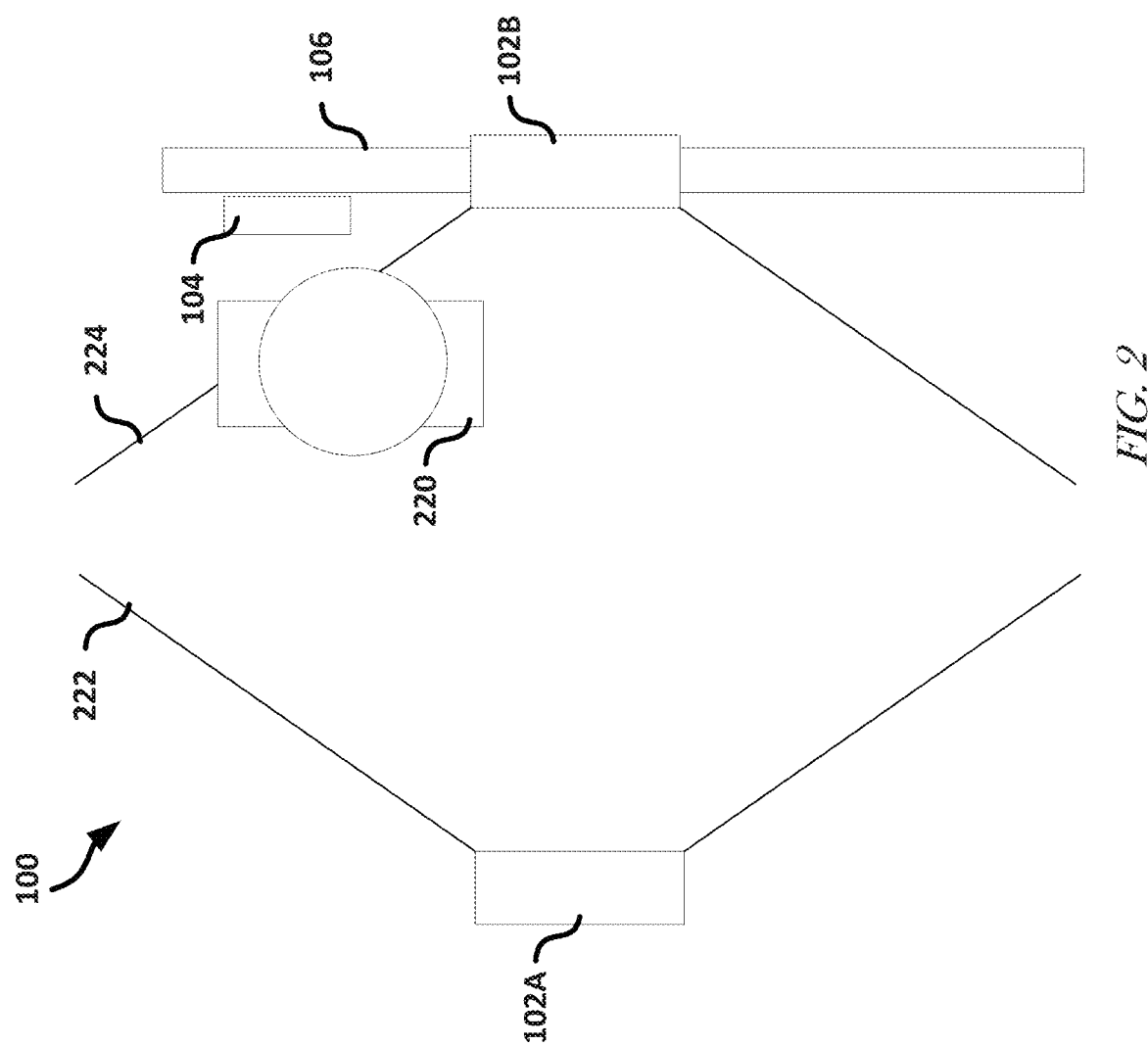
FIG. 2 illustrates, by way of example, a diagram of an embodiment of the system from a perspective indicated by arrow labelled "2" in FIG. 1.

FIG. 2 illustrates, by way of example, a diagram of an embodiment of the system 100 from a perspective indicated by arrow labelled "2" in FIG. 1. The camera 102A faces the camera 102B. The region 106 is within the FOV 222 of the camera 102A. The camera 102B can face away from the region 106 or generally opposite the camera 102B. The camera 102B can include an FOV 224 that includes a region immediately in front of the region 106. The camera 102B can thus be positioned to capture a face, or a part of a person that includes the face, of a person approaching or otherwise in the FOV 224.

Figure 3:
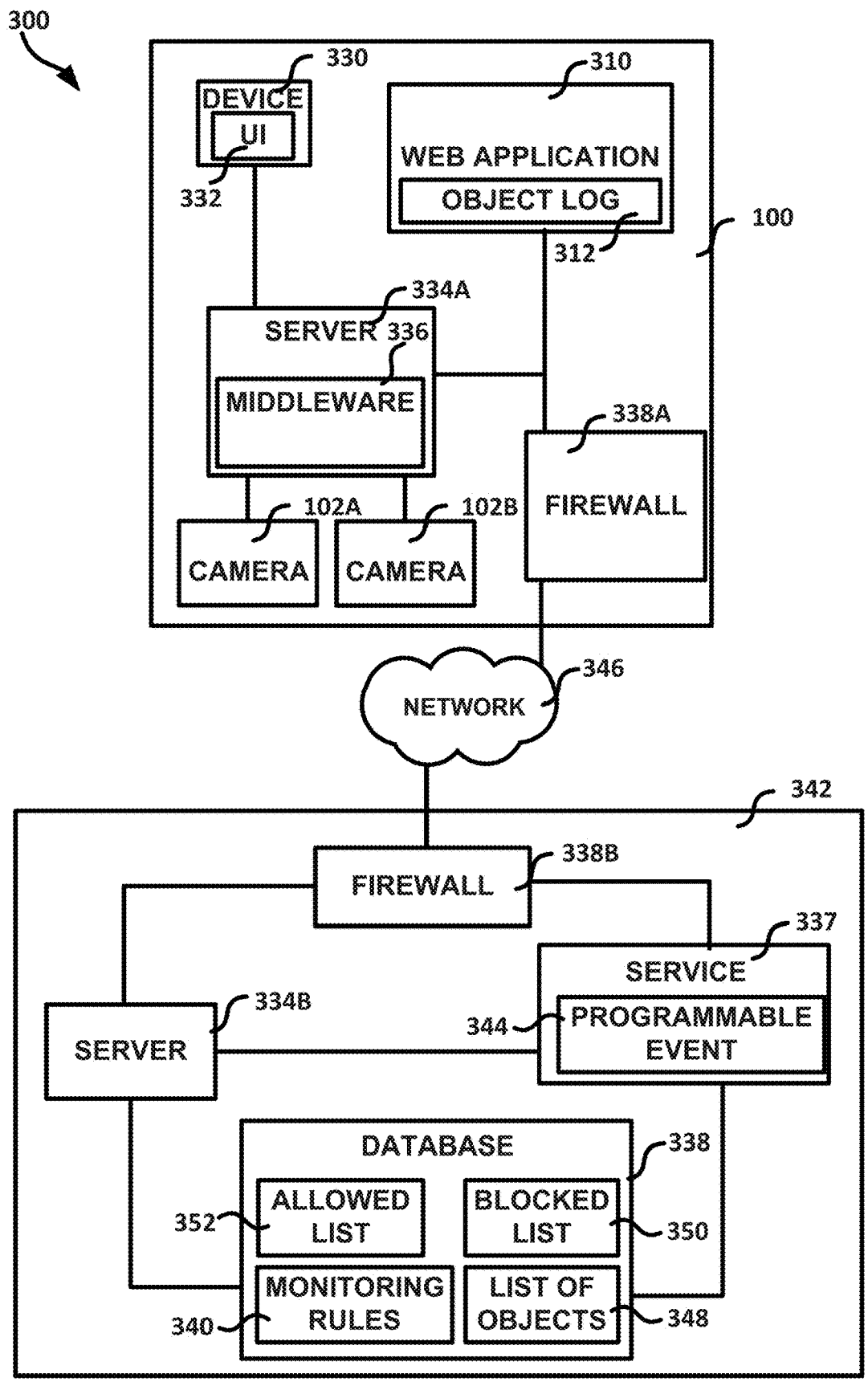
FIG. 3 illustrates, by way of example, a diagram of an embodiment of a system for correctional facility object management.

FIG. 3 illustrates, by way of example, a diagram of an embodiment of a system 300 for correctional facility object management. The system 300 as illustrated includes a correctional facility system 100 and a backend system 342. The correctional facility system 100 includes a mobile device 330, a web application 310, a server 334A, cameras 102A, 102B, and a firewall 338A. The backend system 342 includes a firewall 338B, server 334B, service 337, and a database 338.

One or more monitoring rules 340 can be assigned to a camera 102A, 102B. The monitoring rules 340 can include a motion detection rule, an object specific rule, a personnel specific rule, a combination thereof, or the like. The monitoring rules 340 can include.

User defined processes can be assigned to a programmable event 344. User defined processes can include, for example, that a service 337 can search for predefined restrictions that might preclude an incarcerated person from being able to access an object 104. The user defined processes can validate that an incarcerated person is allowed to access the object 104. The user defined process can validate that the incarcerated person is allowed to access the object 104 at a specified time (a time indicated by the camera 102B). The user defined process can validate that the incarcerated person has returned the object 104 within a specified period of time from retrieving the object 104. The programmable events 344 can be performed based on frame data from the camera 102. The frame data can include metadata that details the location of the camera 102, such as by camera identification, a time the frame was captured by the camera 102, or the like. The user defined processes can include a user causing a camera 102 to generate pixel data to be used to scan for an incarcerated person in a specific location (e.g., a multi-purpose room, such as a rec room, a holding cell, cafeteria, a visitation room, a private room, kitchen, machine shop, sewing room, wood shop, or the like).

A user can define an object checkout time window or an object return time window for scheduled or non-scheduled object checkouts. A checkout time can indicate a window of time in which an incarcerated person is allowed to obtain and use the item. A check in time can indicate a time by which an incarcerated person is expected to return an item.

A user (e.g., a system administrator) can define or allow scheduled or non-scheduled incarcerated person object retention to not trigger an alert. This allowance can be granted on a per incident, per incarcerated person, or per group basis. In such a configuration, an object return time or checkout time can be authenticated late without triggering an alert. In one or more embodiments, the allowance can be granted to an incarcerated person that has few, no, or only certain restrictions or incarcerated persons in good standing. A record of the late check in or authorized checkout can be recorded even if no alert is created. The record can include the time the incarcerated person was authenticated, or what time the incarcerated person received or retrieved the object 104. The record can include an indication of how late the incarcerated person was in returning the object 104. The system 300 can notify one or more specified users in response to an incarcerated person checking in or checking out the object 104. The notification (e.g., message) can include the date or time of check in or checkout, a unique ID associated with the incarcerated person, or other information pertinent to the object or incarcerated person.

If a camera 102 becomes inoperable (e.g., because the camera 102 failed or the incarcerated person damaged it either intentionally or unintentionally) the object 104 status can be manually entered into the system, such as through server 334A via a user interface 332 of the mobile device 330. The record associated with such an authentication can include an indication that the authentication was done manually or the reason the authentication was done manually.

A programmable event 344 can be associated with more than one camera 102. For example, in the example of object management, the camera 102A-102B can perform intermittent (e.g., periodic) polling of their FOV 222, 224. If a specified number of pixels include changed pixel values that are not caused by changes in the ambient light (e.g., by turning on or shutting off a light), the camera 102A-102B can analyze or provide image data for analysis. The server 334A or 334B can instruct or poll the camera 102A-102B for collected data or the cameras 102A-B can be programmed to send the collected data to the server 334A-334B or the service 337. The data can be sent as soon as the data is collected, on a pre-determined schedule, or a combination thereof.

One or more of the cameras 102A-102B can be configured to generate pixel data constantly or intermittently. The intermittent data collection of cameras 102 can be helpful in monitoring areas where incarcerated persons are not expected to be or in monitoring transit points to monitor the progress of incarcerated persons in transit. When one of these cameras 102 detects the presence of object or entity movement, an alarm or message can be sent to the proper personnel, such as through the server 334 or the network 346. The message or alert can be a text, or other content, message to a mobile device, an email (e.g., including an attachment), or other notification.

The data sent from the cameras 102A-102B to the server 334 can be encrypted. The data from the camera 102 can be sent to a server 334 that is running middleware 336 (e.g., software that provides services to a software application beyond those available from an operating system or an application that logically and physically runs between a sender and a receiver).

In one or more embodiments, rather than using middleware 336 or calling one or more services 336 (e.g., services provided over the internet or through the network with or without the internet), the camera 102 can include one or more services, which may be in the form of an application programming interface (API), database connectivity client, or other logical element to perform the functions of the middleware 336 or the service 337. The processing circuitry 112 can be configured to perform these operations in some embodiments. An example of a camera 102 that can be used to perform the functions of the middleware 336 or the service 337 is a smart camera, such as a camera capable of being coupled to the internet, a smart phone with a camera, or the like.

The mobile device 330 can include a user interface 332 configured to show information related to object management. The mobile device 330 can be configured to display, such as on user interface 332 a schedule to a user indicating when or where camera 102 scans are to occur.

The server 334 can be part of a Local Area Network (LAN), or it can be hosted remotely. The middleware 336 that can be accessible through the server 334 can either be hosted locally (e.g., through a LAN) or remotely. The middleware 336 can send data received or modified by the server 334 or middleware 336 to a service 337.

The cameras 102 can be coupled to the server 334 such that data can be sent to the server 334 from the camera 102 and data can be sent to the camera 102 from the server 334. The server 334 can be coupled to the web application 310, such as to host the web application 310. The server 334 can be coupled to the firewall 338A so data sent from and received at the system 300 can be protection scanned, encrypted, or decrypted.

While the server 334B, service 337, and the database 338 are depicted as individual units, they may be implemented on one or more servers. For example, the server 334B, service 337, and database 338 may all be implemented on the same server, or each may be implemented on its own server.

The web application 310 can render web pages that can provide the functionality of the service 337 to a user. The web application 310 can be hosted locally, such as on server 334A, or remotely, such as on server 334B.

The networked system can include the system 100 coupled to the system 342, such as through a network 346 (e.g., the internet). The system 342 can sometimes be referred to as being part of the "cloud". The cloud allows a user to utilize someone else's computers or storage devices over the Internet.

Such a configuration can allow the data storage for and analysis of monitoring objects in the correctional facility to be hosted off site. The system 342 can include a firewall 338B coupled to a server 334B and a service 337. The firewall 338B can help to ensure that the data sent to the server 334B and the service 337 will not harm the server 334B or service 337. The firewall 338B can help in decrypting communications, ensuring data is sent from a permitted (registered or authenticated) sender, or the like. The server 334B can be coupled to a database 338, such that the database 338 can provide data to the server 334B and receive data from the server 334B. The server 334B can be coupled to the service 337, such that the service 337 can provide functionality related to automated incarcerated person documentation to the server 334B. The data received at the server 334B can be used in rendering web pages to users. The database 338 can be coupled to the service 337 to provide data to the service 337 and to receive and store the results of operations performed by the service 337.

The database 338 can include one or more of an allowed list 352 or a blocked list 350. The allowed list 352 can indicate which personnel of the correctional facility are permitted to take the object 104. The blocked list 350 can indicate which personnel are not permitted to take the object. If either (i) the personnel detected taking the object 104 is not on the allowed list 352 or (ii) the personnel detected taking the object 104 is on the blocked list 350, an alert can be generated and provided to the device 330.

The allowed list 352 or blocked list 350 can be location specific. For example, consider a correctional facility with a wood shop and a custodial closet. Some incarcerated persons are assigned to work in, and are allowed to access objects in, the kitchen and some other incarcerated persons are assigned to work in, and are allowed to access objects in, the custodial closet. The allowed list 352 or blocked list 350 can include entries that each include an incarcerated person and a corresponding location in which the incarcerate person is allowed or not allowed to access the objects, respectively.

The allowed list 352, in some embodiments, can additionally or alternatively include data indicating locations in which an object 104 is allowed to be used or stored. The blocked list 350, in some embodiments, can additionally or alternatively include data indicating locations in which an object 104 is not allowed to be used or stored.

The allowed list 352 or blocked list 350 can be time specific. For example, consider an incarcerated person that has custodial duties from 10 PM-4 AM. That incarcerated person can be on the allowed list 352 with a corresponding time entry of about 10 PM-4 AM or on the blocked list 350 with a corresponding time entry of about 4 AM-10PM.

A user of the device 330 can edit the list of objects 348, the allowed list 352, the blocked list 350, or the monitoring rules 340, such as through the web application 310 or the middleware 336. If an object 104 is damaged, used up (like the wire nuts or tape), at the end of its useful life, or otherwise removed from the region 106 permanently, the personnel can remove or deactivate the object from the list of objects 348. If an object is added to the region 106, the personnel can add or activate the new object in the list of objects 348. If an incarcerated person is deemed to be "trustworthy" or has been deemed "not trustworthy", the incarcerated person can be added to the allowed list 352 or blocked list 350, respectively.

The firewalls 338A-338B can scan incoming and outgoing data for malware to help prevent a malicious attack on the system 300. The firewall 338A can encrypt data that is outgoing or decrypt data that is incoming. The encryption or decryption can be accomplished using a separate encryption or decryption module and can be incorporated at different places in the system such as on a camera 102, so as to allow encrypted data sent to be sent to the server 334B.

The service 337 can be deployed locally on the server 334B or hosted remotely. The service 337 can retrieve programmable events 344 currently assigned to a camera 102. The programmable events 344 can be stored in the database 338, on the server 334A-334B, or on the service 337. The service 337 can run processes associated with a programmable event 344. For example, the service 337 can analyze, organize, or format collected data. The analyzed, organized, or collected data can be sent to the database 338 for retention. The analysis can include comparing the data to monitoring rules 340 associated with a programmable event 344. Such comparisons can monitor compliance and detect violations of the monitoring rules 340 and an alarm, alert, or message can be sent to the proper personnel when a monitoring rule 340 has been violated.

The service 337 can correlate collected data. Correlating data can help the service 337 detect a violation of a monitoring rule 340. A correlation can be performed at an individual incarcerated person level, a block level, an entire building (e.g., secure facility, such as a detention center, mental health facility, or the like) level, or other level. For example, the service 337 can correlate all data associated with the same incarcerated person, object, cellblock, or the like and compare that data to the monitoring rules 340 relating to the incarcerated person, object, or the cellblock to determine if the incarcerated persons comply with the monitoring rule or a violation has occurred. The service 337 can compare one incarcerated person's data to another incarcerated person's data to determine if a monitoring rule 340 violation has occurred. Such comparisons can be useful when a monitoring rule 340 states that an object 104 is only to be used by the entity seen taking the object 104 from the region 106. The service 337 can be hosted locally (as shown) or can be hosted on the network 346 (e.g., cloud).

The service 337 can receive and process data from the middleware 336. The processing can include authenticating a customer name. Authenticating a customer name can be done by verifying a customer's port number in examples where a customer has been assigned a unique port number. Authenticating can also include verifying camera ID information received is consistent and assigned to that customer.

A user (e.g., an end user) can automate the running of programmable events 344 through scheduling them through the service 337. A user can manually trigger a programmable event 344 to for the service 337 to execute. The user can customize the operations performed by the service 337 in running a programmable event 344, such as through the server 334A-334B or web application 310. The service 337 can compare data received to monitoring rules 340 and determine if a monitoring rule 340 has been violated. The service 337 can initiate an alert process in response to determining that a rule has been violated.

The service 337 can analyze the data received from the cameras 102 and compare results from analyzing the data (location, object ID, incarcerated person ID, time, etc.) to relevant monitoring rules 340 to determine if an alert or message should be sent to the relevant personnel. If no violation is detected, the service 337 can initiate a sequence of operations (e.g., a pre-programmed sequence of operations, processes, or events) to complete. For example, the service 337 can look for a violation of a user defined process rule (e.g., an object 104 is not returned and the time for return has elapsed). The service 337 can then search for the object 104 within the correctional facility, such as by analyzing frame data from other applications. The service 337 can then continue to perform another process (e.g., a user defined process), such as documenting the locations of one or more inmates that are expected to have the object 104 within the field of view of a camera 102. Future data received can be analyzed (e.g., compared to monitoring rules 340) in real-time to determine if an alert or message is to be sent. When the analysis is complete, the service 337 can record that the analysis was completed or results of the analysis in the database 338. Data from the database 338 can be stored in the object log 312

In the case of an Internet failure (e.g., the Internet is temporarily unavailable) the middleware 336 can be configured to store received data in a local memory. When Internet connectivity is restored, the received data can be sent to the service 337. Such a configuration can be helpful in embodiments that include Software as a Service (SaaS) or a remotely hosted server. The middleware 336 can be configured to determine if a monitoring rule 340 has been violated, such as when the Internet connection to the service has failed. In one or more embodiments, the middleware 336 includes a subset of all the monitoring rules 340 for a specific system. These monitoring rules 340 can be the most important rules (e.g., the rules that the user does not want violated). In one or more embodiments, the service 337 can determine if a monitoring rule 340 has been violated after it has received the relevant data.

The middleware 336 can reside on the server 334A or 334B, locally or remotely, respectively. In one or more embodiments, the middleware 336 can be hosted in a network 346 (e.g., cloud) server. Such an implementation can provide automated object documentation to a user through a Software as a Service (SaaS) configuration. The middleware 336 can provide communication between the cameras 102A-102B and the system 342. The middleware 336 can be configured to encrypt data it receives from the camera 102 and send the encrypted data to the service 337, server 334B, or the database 338.

The database 338 can store data from the cameras 102A-102B, the service 337, the web application 310, or the server 334A-B.

The programmable event 344 can include a recurring event or an event that is to repeat zero or more times. A programmable event 344 that does not recur is called a one-time event. Examples of programmable events 344 that recur include scheduled shop time, kitchen operation time, janitor services, among others. A user can specify incarcerated person IDs, one or more time windows, checkout times, allowed or disallowed objects per incarcerated person ID and object ID, among others.

The cameras 102A-102B can provide image data at times corresponding to programmable events 344, when the cameras 102A-102B detect motion (a change in pixel intensity of a specified number of pixels), or the like. The middleware 336 or service 337 can analyze the image data from the camera 102A to determine when an object 104 is retrieved from the region 106. The middleware 336 or service 337 can recognize the object 104 retrieved, such as by using an object recognition technique (discussed in more detail elsewhere herein). The middleware 336 or service 337 can analyze image data from the camera 102B that corresponds to a time at which the object 104 was retrieved. This analysis can include image data from a specified time before the object 104 was retrieved to about a specified time after the object 104 was retrieved. The middleware 336 or service 337 can identify a person that retrieved the object 104. The middleware 336 or service 337 can perform facial recognition (or other object recognition) to identify the person in that took the object 104. The middleware 336 or service 337 can create an entry in an object log 312 that indicates the time the object 104 was retrieved, an object ID that uniquely identifies the object 104, a personnel ID that uniquely identifies the person that retrieved the object 104, a location from which the object 104 was retrieved, a combination thereof, or the like.

The object log 312 can be used to train a model, different from an object recognition model or facial recognition model of the service 337 or the middleware 336, that identifies object usage patterns. The model can be trained using non-anomalous entries of the object log 312, such as a synthetic (e.g., man-made, not automatically made) or object log 312 generated based on actual correctional facility activity. The model can then be provided an entry of the object log 312 and provide a classification of the object log as anomalous (unexpected behavior) or normal (expected behavior). If the model determines that the entry corresponds to anomalous behavior, an alert can be provided to the device 330.

The middleware 336 or service 337 can recognize the object 104 is returned to the region 106. The middleware 336 or service 337 can use the same object recognition technique to determine that the object 104 is returned.

An incarcerated person can attempt to fool or trick the object recognition technique. An incarcerated person can additionally or alternatively modify an object 104 before returning it to the region 106. A modification can include removal of a part (e.g., splitting a scissors in half and returning half the scissor), augmenting (e.g., taping the object 104 to obfuscate a view of the object 104), or the like. The middleware 336 or service 337 can detect whether the returned object 104 is the same or different as the object 104 that was taken. The middleware 336 or service 337 can detect whether the returned object 104 is modified. More details regarding how these are determined are provided elsewhere.

The object log 312 can be stored locally on the camera 102 or other component of the system 100, on the database 338, or the like. The object log 312 can be analyzed by the middleware 336 or service 337 in determining whether the monitoring rule 340 has been violated.

A list of objects 348 can be stored on the camera 102, server 334, or the database 338. The list of objects 348 can be generated by personnel of the correctional facility. The list of objects 348 can detail the objects 104 expected to be detected in the FOV 222 of the camera 102A. The list of objects 348 can be used by the middleware 336 or service 337 to determine if an object is missing.

The database 338 can be populated with images and demographic information of incarcerated persons from third party software, including jail, incarcerated person, and case management software systems. Demographic information can include height, weight, hair color, gender, tattoo information, and other (e.g., unique) physical characteristics, as well as security-critical information, such as inmate housing assignments, as well as inmate security restrictions or keep separate information that details one or more inmates to be physically separate at all times. Images and video of specific incarcerated persons can be manually uploaded to the system 100 or 342 or integrated with a system 342, such as a video management system or mobile devices, aiding in ongoing machine learning to assist in increasing identification accuracy of one or more incarcerated persons. An initial image of an incarcerated person can be provided to the system 342 to aid in feature extraction. An image can be replaced after a specified period of time, such as to account for natural or other changes in a person's appearance.

One or more cameras 102 can be installed in the booking area of a correctional facility, primarily nearest the camera 102 responsible for taking inmate mugshots. This fixed camera can capture video and images uploaded to the system 100 to supplement machine-learning identification.

Fixed cameras 102 can provide a live video feed or captured video. These cameras 102 can be mounted at or near an ingress or egress of a location, such as a cellblock, pod, or housing unit location. Another camera 102 can be located on the opposite side of the ingress or egress. The video feed from one camera can capture one or more inmates' faces, converting the live video feed or recorded video to an encrypted video stream. The second camera can capture video and create a second encrypted video stream. The streams can be exposed to facial recognition software within the system 100. The system 100 can identify one or more correctional facility personnel using facial recognition, confirming both camera location and the direction of the inmate's movement based on the time and date from the first video stream and the second video stream.

The recognition technique can identify objects and location within the stream itself by reading posted signage or identifying unique objects or staff members within any of the live streams. This data can be tagged as descriptive metadata. Examples of other, not necessarily facial, features include a distinctive number on clothing (an inmate number), a tattoo, a birthmark, or the like.

The camera 102 can include a 360-degree view, a fish-eye view, or other view. A digital threshold (indicative of an ingress or egress point) can be created to aid in determining an incarcerated person or staff member position relative to other ingress or egress points that may appear in view. For example, a 360-degree camera may be located in such a way that two or more rooms and an ingress or egress thereto are in view.

In some embodiments, an incarcerated person can wear an identification card or wristband that contains an image (e.g., mugshot) on their front or backsides. The identification card or wristband can also have the incarcerated person's last name or booking number, for example, that can be identified by the system 100 and associated with the incarcerated person.

In the event that the incarcerated person is intentionally obscuring their face from camera view, or is oriented in such a way to the camera 102 that facial recognition cannot be verified or verified with a high-degree of accuracy, the system 300 can use object detection to determine the inmate's credential, or reading the incarcerated person's name or booking number to ascertain identity.

If incarcerated person identification is performed via object detection, versus facial recognition, a log entry with a specialized comment or icon can be used to make the clear the method of identification performed. If object identification is used to determine incarcerated person identity repeatedly within a configurable period of time, an electronic log entry and system notification can be dispatched to a certain group of users (e.g. supervisors) or the nearest staff member to recommend two-factor incarcerated person identification for security purposes.

The database 338 can support a library of stored images and videos of correctional officers associated with the officer's name, employee ID, or other demographic information (e.g., information that is unique alone or in aggregate). The system 300 can identify correctional officers via facial recognition in the same manner as incarcerated persons are identified.

The system 300 can use machine learning (ML) or artificial intelligence (AI) to identify when observable actions may require immediate escalation. The ML or AI technique can include an edge detection primal sketch, recognition by parts, an appearance-based method, such as an edge matching technique, a divide and conquer search, a greyscale matching, a gradient matching, a histogram of respective field response, or a large model base, a feature-based technique, such as an interpretation tree, a hypothesize and test technique, a neural network (NN), such as a convolutional neural network (CNN) trained on image data, a pose consistency technique, a pose clustering technique, an invariance technique, a geometric hashing technique, a scale-invariant feature transform (SIFT), a speeded up robust features (SURF) technique, a 3D reconstruction technique, or the like. Other techniques exist and too numerous to mention here.

The system 300 can bookmark and record the video segment that triggered the alert (in the database 338), allowing system administrators to review the entirety of the incident for legal purposes, if necessary. System administrators can also determine the retention requirements for the video, as well as safeguard access to the video for chain of custody purposes.

The system 300 can help authenticate program attendance and instructor access. One or more cameras 102 can be located near classrooms and areas designated to education. The system 300 can cross reference incarcerated person movements against outstanding out of cell movements to ensure that inmates are attending the intended class or seminar. Using machine learning, this unauthorized access feature can extend to staff accountability by notifying supervisors if there no officer properly escorting an inmate to a classroom or designated area for education.

Figure 4:
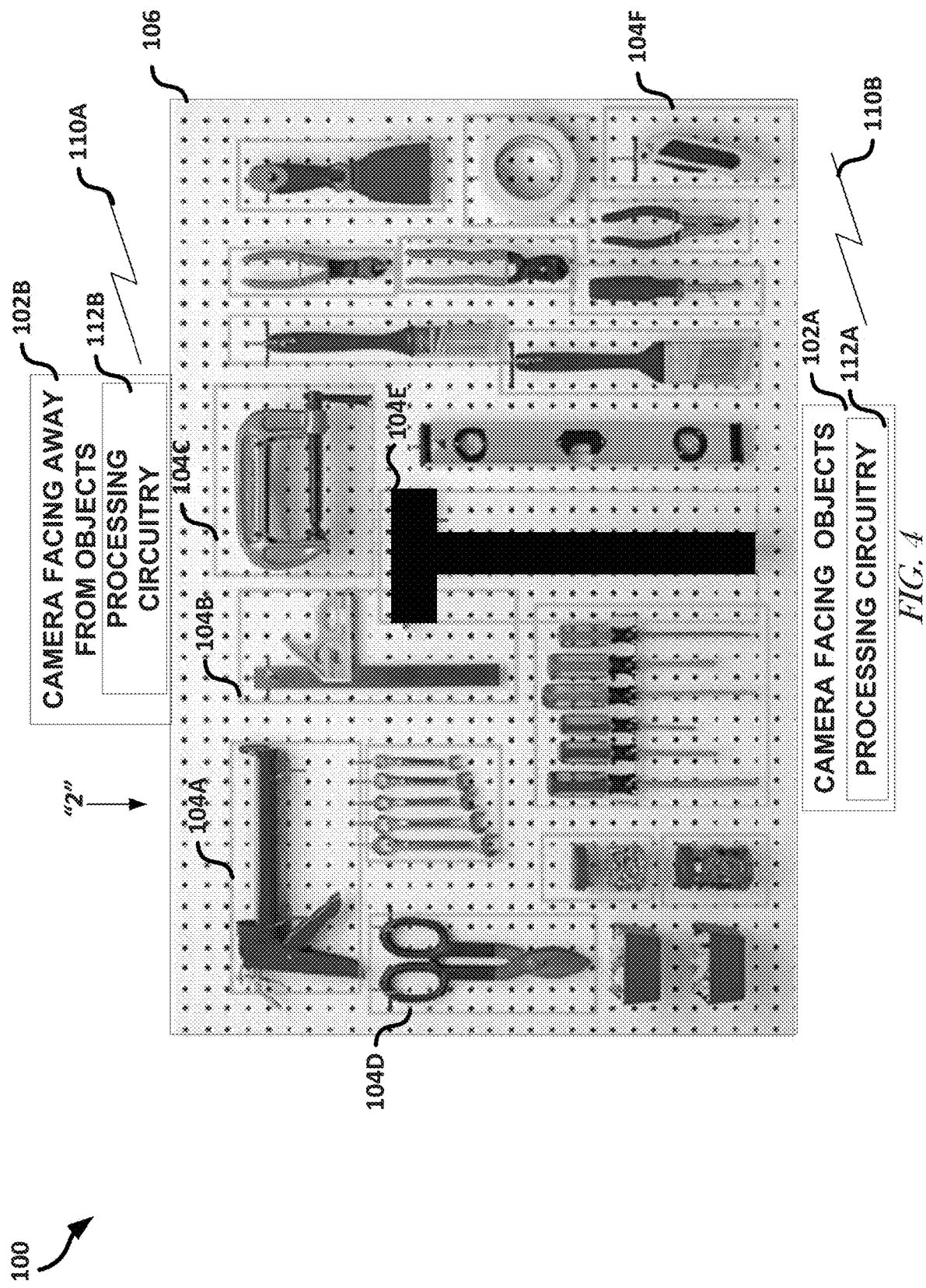
FIG. 4 illustrates, by way of example, a diagram of an embodiment of the system after the object has been removed.

FIG. 4 illustrates, by way of example, a diagram of an embodiment of the system 100 after the object 104E has been removed. The middleware 336 or service 337 can be programmed to detect each of a number of objects 104 in a list of objects 104A, 104B, 104C, 104D, 104E, 104F. The middleware 336 or service 337 can perform object recognition on the image data of a frame and identify all of the objects in the image data. The middleware 336 or service 337 can further determine a number of each class of object 104 in the image data.

In the example of FIG. 4, the middleware 336 or service 337 can determine there is one caulk gun, one right angle ruler, one clamp, two paint brushes, one metal snips, one wire stripper, one wire cutter, one roll of tape, one box cutter, one caulk knife, one level, six screw drivers (or three blue screw drivers and three red screwdrivers) one scissor, six crescent wrenches, one jar of screws, one jar of nails, and two containers of wire nuts. This list of identified objects can be compared to a list of objects expected in the region 106. This list can be provided by personnel of the correctional facility. The list for the region 106 of FIG. 4 can be as follows:

one caulk gun,
one right angle ruler,
one clamp,
one hammer,
two paint brushes,
one metal snips,
one wire stripper,
one wire cutter,
one roll of tape,
one box cutter,
one caulk knife,
one level,
six screw drivers (or three blue screw drivers and three red screwdrivers),
one scissor,
six crescent wrenches,
one jar of screws,
one jar of nails,
two containers of wire nuts By comparing the objects detected to the objects expected, the middleware 336 or service 337 can determine that the hammer object 104E is missing from the region 106. The middleware 336 or service 337 can then determine if a monitoring rule 340 is violated, such as by determining if the object 104E should have been returned or if the object 104E is still validly checked out. If a monitoring rule 340 has been violated, an alert can be provided to the device 330.

Figure 5:
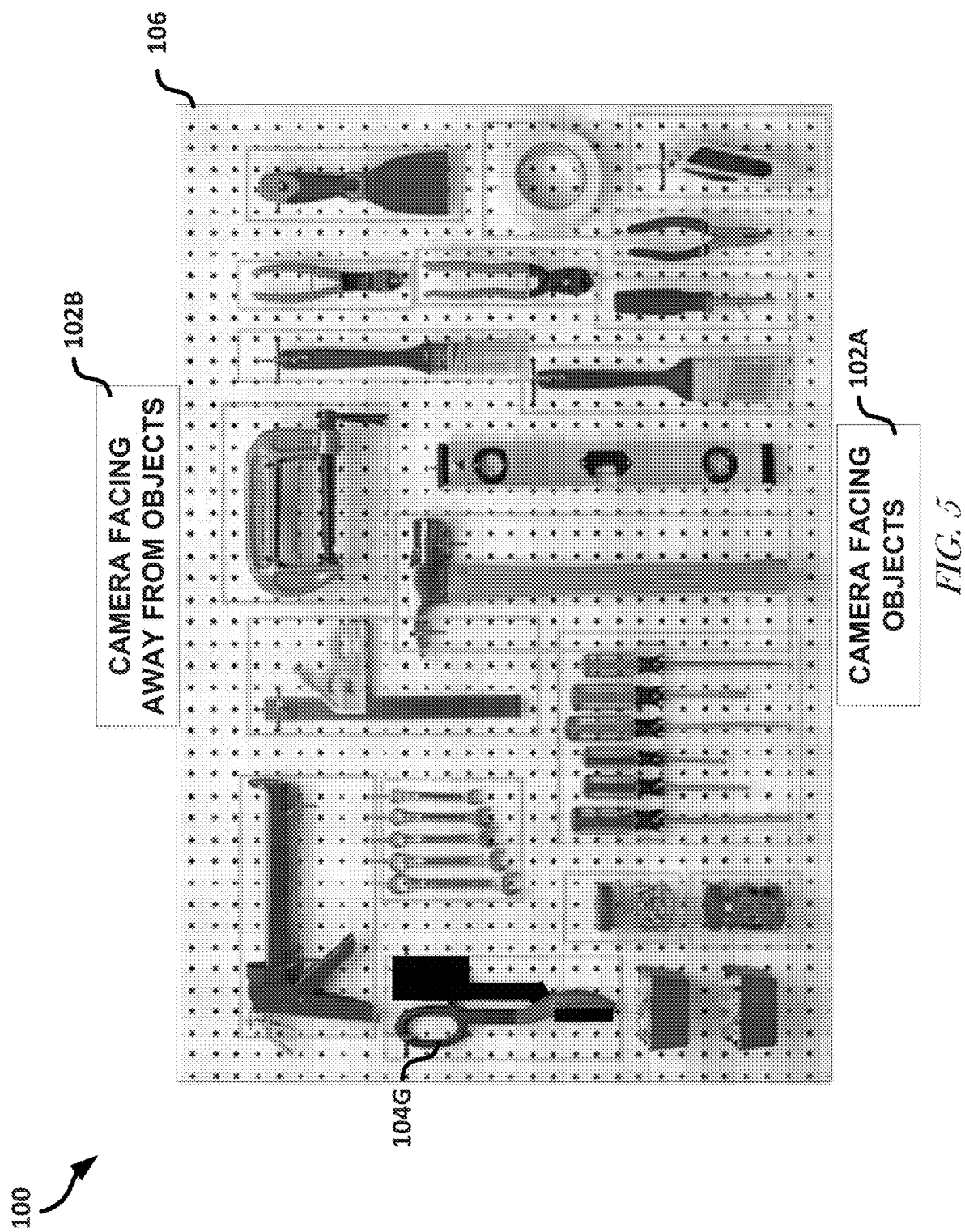
FIG. 5 illustrates, by way of example, a diagram of an embodiment of the system with a modified object returned in place of the object.

FIG. 5 illustrates, by way of example, a diagram of an embodiment of the system 100 with a modified object 104G returned in place of the object 104D. The middleware 336 or service 337 can perform object recognition on the image data from the camera 102 to generate the following list of objects one caulk gun, one right angle ruler, one clamp, two paint brushes, one metal snips, one wire stripper, one wire cutter, one roll of tape, one box cutter, one caulk knife, one level, six screw drivers (or three blue screw drivers and three red screwdrivers), one hammer, six crescent wrenches, one jar of screws, one jar of nails, and two containers of wire nuts. This list can be compared to the list of objects 348 provided regarding FIG. 4. The comparison can indicate that the scissor (object 104D) was not returned. The middleware 336 or service 337 can generate an alert to the device 330. Upon inspection, correctional facility personnel will notice that half the scissor is missing.

The middleware 336 or service 337 can help the personnel identify an incarcerated person that last had the scissor checked out, where that incarcerated is now, and where that incarcerated was between the scissor being checked out and now. The personnel can thus be aided in tracking down the other half of the scissor, thus preventing use of the half scissor as a weapon.

An incarcerated person may try to fool the system 100 by, for example, replacing an object 104 with a picture of the object 104. Such a fake can be detected by either usual object recognition techniques that do not confuse 2D and 3D objects or by comparing pixel values of a recognized object to expected pixel values of the object. Such expected pixel values can be stored in the database 338, the server 334, camera 102, or the like. The expected pixel values can change over time. The expected pixel values can be updated (e.g., periodically updated) based on image data from the camera 102. The middleware 336 or service 337 can compare current pixel values from the image data to the expected pixel values. If a specified number (e.g., 1%, 2%, 3%, 4%, 5%, 6%, a greater or lesser percentage or some percentage therebetween) of current pixel values varies from the expected pixel values by more than a threshold amount (e.g., 1%, 2%, 3%, 4%, 5%, 6%, a greater or lesser percentage or some percentage therebetween), the middleware 336 or service 337 can issue an alert indicating that the object 104 might be a fake.

In some embodiments, the middleware 336 or service 337 can be trained to classify an object 104 as "other", "unidentified", or the like. Then, when an object 104 is classified as "other", or the like, the middleware 336 or service 337 can issue an alert indicating that an unexpected object was detected in the region 106. Correctional facility personnel can then take corrective action.

Figure 6:
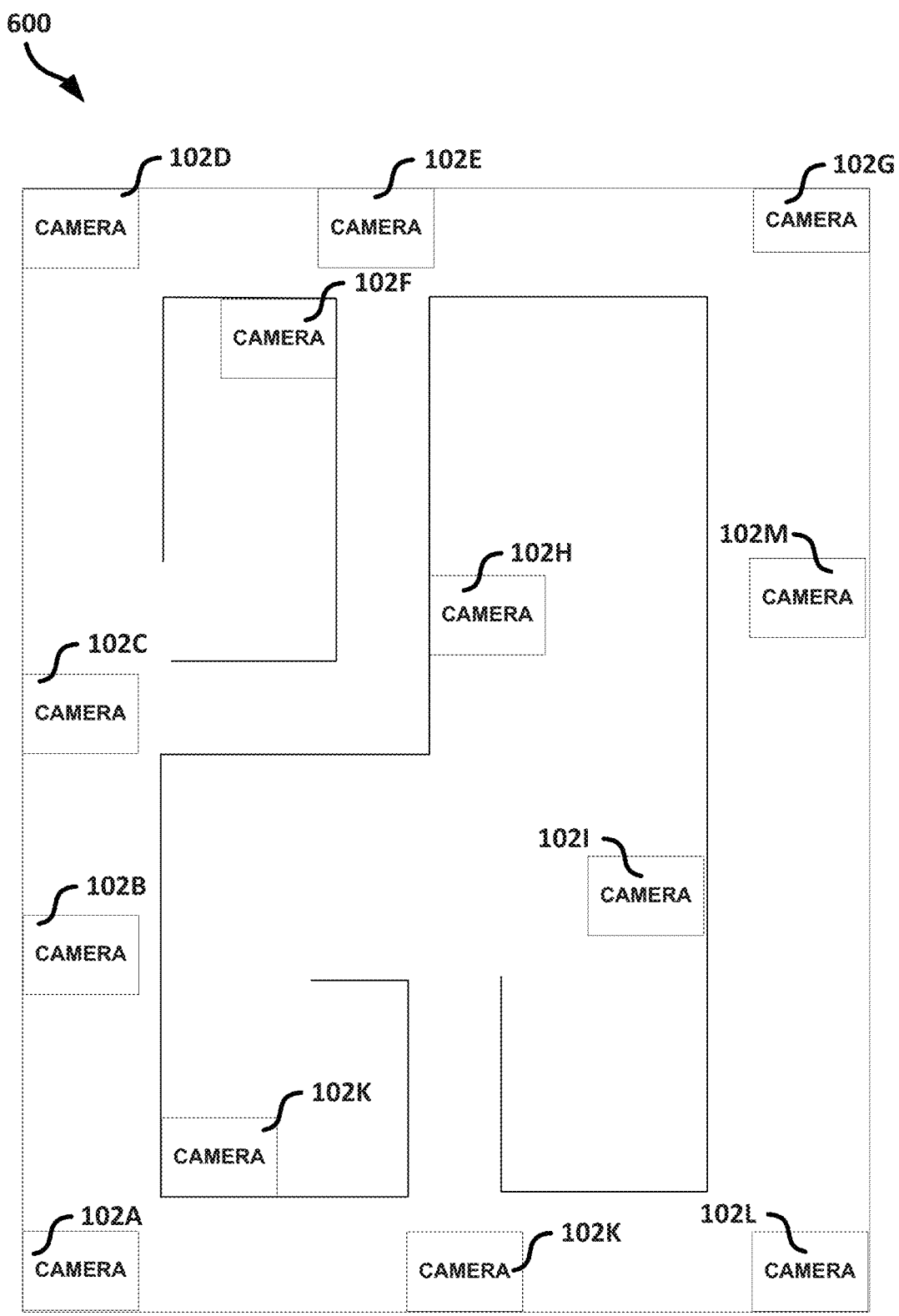
FIG. 6 illustrates a building outfitted with cameras configured to monitor incarcerated persons and objects.

FIG. 6 illustrates a building 600 outfitted with cameras 102A, 102B, 102C, 102D, 102E, 102F, 102G, 102H, 102I, 102K, 102L, 102M, configured to monitor incarcerated persons and objects 104. One or more monitoring rules 340 associated with a programmable event 344 can define a tracking action associated with an incarcerated person that was last known to have an object 104.

In this example, if any of cameras 102A-102M provides image data that is analyzed and determined to include a feature associated with the incarcerated person or the object 104 and before the alert is cleared, such as manually by correctional facility personnel or returning the object 104, an alert can be provided to the device 330 indicating the location of the incarcerated person.

Current or historical movement data of the incarcerated person can be graphically represented on an electronic map of the facility, such as the map of the facility shown in FIG. 3. Information pertinent to a movement can be overlaid at positions corresponding to where the information was collected.

Embodiments provide automation of incarcerated person and other correctional facility personnel monitoring, such as by using facial recognition, object recognition, or other feature recognition technology. The feature recognition can be implemented, at least in part, by one or more of the web application 310, middleware 336, camera 102, mobile device 330, service 337, or server 334.

Facial recognition includes identifying or verifying a person from a digital image (pixel data) from a camera 102 or other video source. Facial recognition operates, generally, by comparing features of a face in an image to features in a repository (e.g., a memory, database, or the like). The features can include a texture or shape of a portion of the face.

Facial recognition techniques include feature-based techniques that extract landmarks (or features) from an image of the face. For example, the technique can analyze a relative position, size, or shape of an eye, nose, cheekbone, jaw, hairline, or the like. These features can then be compared to features extracted from other images to determine the identity of the entity associated with the face. Some techniques for face recognition extract data that is useful for face recognition and discard other data. These feature-based techniques are sometimes called geometric techniques. Other techniques can include photometric or holistic based approaches. A photometric approach distills an image into values and compares with templates to help eliminate variance. Some popular facial recognition techniques include principal component analysis using eigenfaces, linear discriminant analysis, elastic bunch group matching, hidden Markov models, multilinear subspace learning, and dynamic link matching, among others.

Other facial recognition techniques include three-dimensional (3D) recognition techniques. In embodiments, the camera 102 produce data that includes x, y, and z coordinates. Sometimes these cameras 102 are called depth cameras. The 3D data from a 3D camera can help identify distinctive features on a surface of a face. Such features can include a contour of an eye socket, shape of a nose, a chin, jawline, cheekbone, or the like. Multiple cameras 102 can be used to generate data that can be analyzed to generate 3D data.

Another feature of an entity can include a visual detail of exposed skin, such as a unique line, pattern, spot, or the like. These features are sometimes referred to as skin prints. In some embodiments, instead of pixel data, the camera 102 can produce a thermal image of an object or entity that can be analyzed in a manner similar to that produced by a color image generating camera. In some embodiments, the facial recognition technique can include a combination of existing facial recognition techniques.

Embodiments regard identification and tracking of people and objects that frequent the correctional facility. Embodiments can use a plurality of cameras 102 (e.g., internet protocol (IP) or other internet capable cameras) that provide live video streams or other video data (e.g., securely) to the Cloud, such as through the network 346. The video data can be live video or previously captured video, such as from a fixed camera or a camera of a mobile device. The video data can be exposed to Cloud-based facial recognition software (e.g., the service 337 or the server 334). One or more databases 338 can include data of characteristics of known incarcerated persons, as incarcerated person images, or security-critical information about these incarcerated persons. This data can be used to help to gain positive facial recognition and inmate management automation. This automation can extend to tracking movements, monitoring recreation and meal offerings, court transports, programs attendance, and a wide range of other incarcerated person and object movement.

The cameras 102A-102M about the facility can generate image data that can be used to identify whether an incarcerated person is or has carried an object out of a region in which the object 104 is expected to be used. The cameras 102A-102M can provide the image data to the service 337 or the middleware 336 which can perform object detection or facial recognition on the image data to determine whether the incarcerated person to which the object 104 is checked out or the object 104 is detected at the location monitored by the camera 102A-102M. The location or camera 102A-102M can be compared to the allowed list or blocked list to determine whether the object 104 is located in allowed or blocked location.

Figure 7:
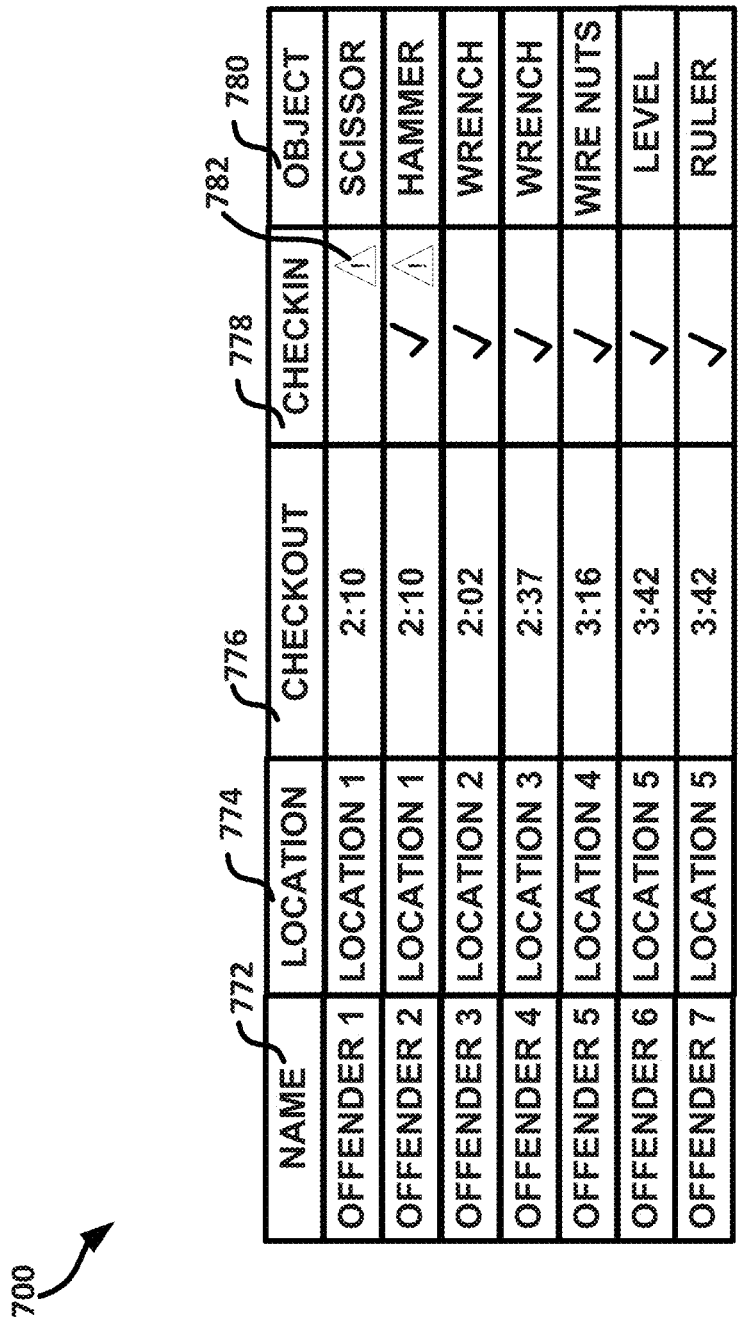
FIG. 7 illustrates, by way of example, a diagram of an embodiment of a user interface for correctional facility object tracking.

FIG. 7 illustrates, by way of example, a diagram of an embodiment of a user interface 700 for correctional facility object tracking. The user interface 700 includes a view that can be provided with and interacted with using the user interface 332. The user interface 700 includes a view of the object log 312. The object log 312 can detail an incarcerated person ID 772, a location 774 from which an object 104 was retrieved, a time 776 at which the object 780 was retrieved ("checkout"), an indication 778 of whether the object 104 has been checked in, and an object ID 780. If a monitoring rule associated with the object corresponding to the object ID 780 is violated, an alert indicator 782 can be provided on the user interface 700. The user can select the alert indicator 782 to view a summary of the monitoring rule 340 that was violated. The alert indicator 782, when selected, can cause a view of a current location of the incarcerated person associated with the incarcerated person ID 772 to be provided. Note that an alert can be generated even if the object 104 is checked in. This could occur if the incarcerated person had the object checked out for more time than allowed, for example.

Figure 8:
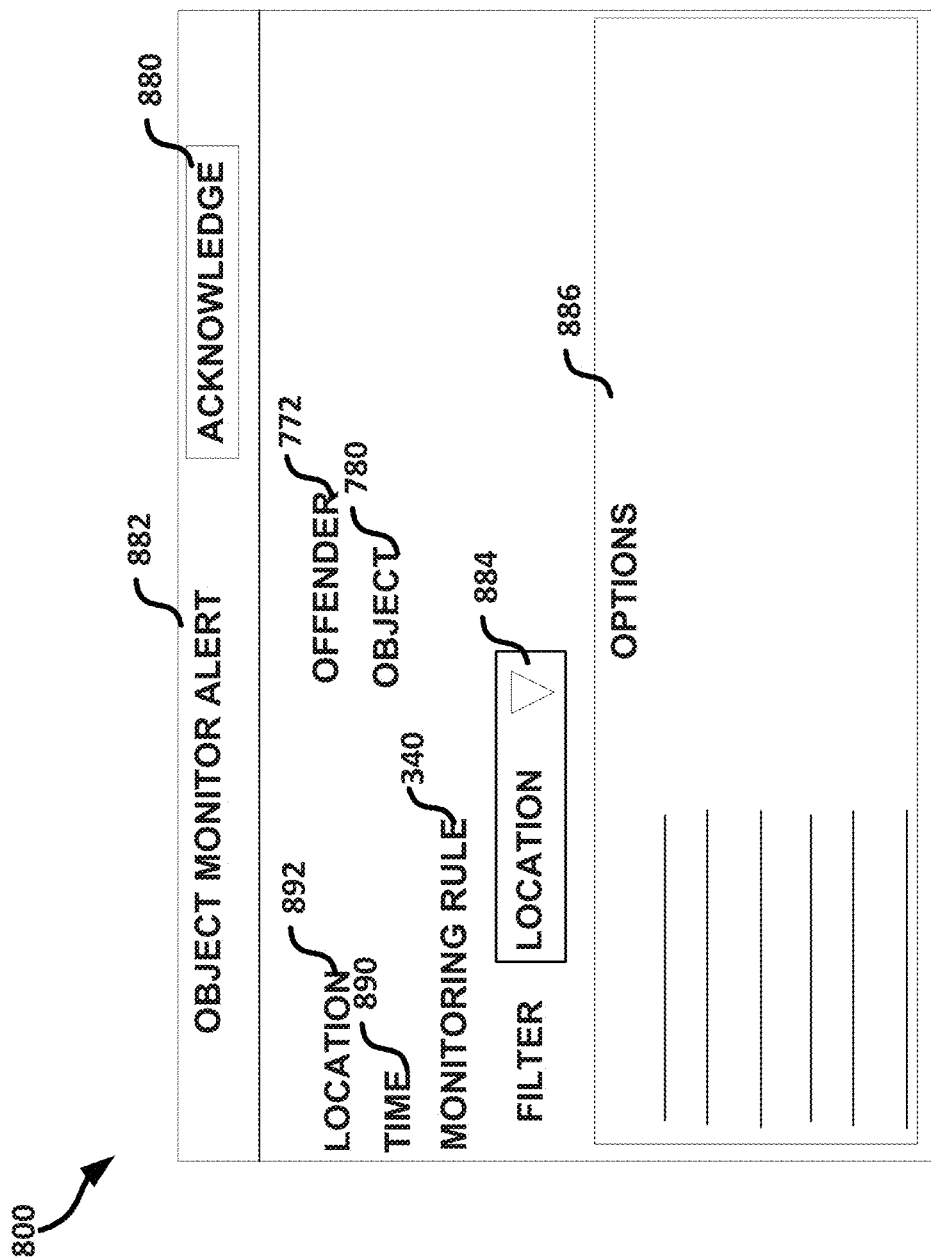
FIG. 8 illustrates a diagram of an embodiment of a user interface that includes an object monitor alert.

FIG. 8 illustrates a diagram of an embodiment of a user interface 800 that includes an object monitor alert 882. The personnel presented with the alert 882 can select options 886 that alter how the object monitor alert 882 is presented. The personnel can filter the object monitor alerts 882 based on location 884. The location 884 can be set to the location or locations for which the personnel are responsible for one or more actions that are being monitored for compliance. The options 886 can allow the personnel to view more or less information or receive fewer or more different object monitor alerts 882. The options can include showing object monitor alerts 882 that are not yet resolved, provide a warning that is acoustic, a mechanical vibration, optical, or a combination, or the like.

Selections by the user on the user interface 800 can alter the data provided on the user interface 332. The user interface 332 can be changed in accord with the option 886 selections of the personnel. The personnel can cause the selections to be stored for future population of the user interface 332 by selecting the acknowledge software control 880.

The monitor alert 882 can provide information that helps the personnel understand why the object monitor alert 882 is issued and determine actions that can be taken to resolve the object monitor alert 882. The information can include one or more of a location 892, time 890, monitoring rule 340, incarcerated person 772, or object 780. The location 892 can indicate a last known location of the incarcerated person 772, object 780, or a combination thereof. The time 890 can indicate the time that incarcerated person 772 or object 780 was in the last known location. The monitoring rule 340 can indicate the rule that was violated and caused the alert 882 to be generated. The incarcerated person 772 and the object 780 were discussed regarding FIG. 7.

Figure 9:
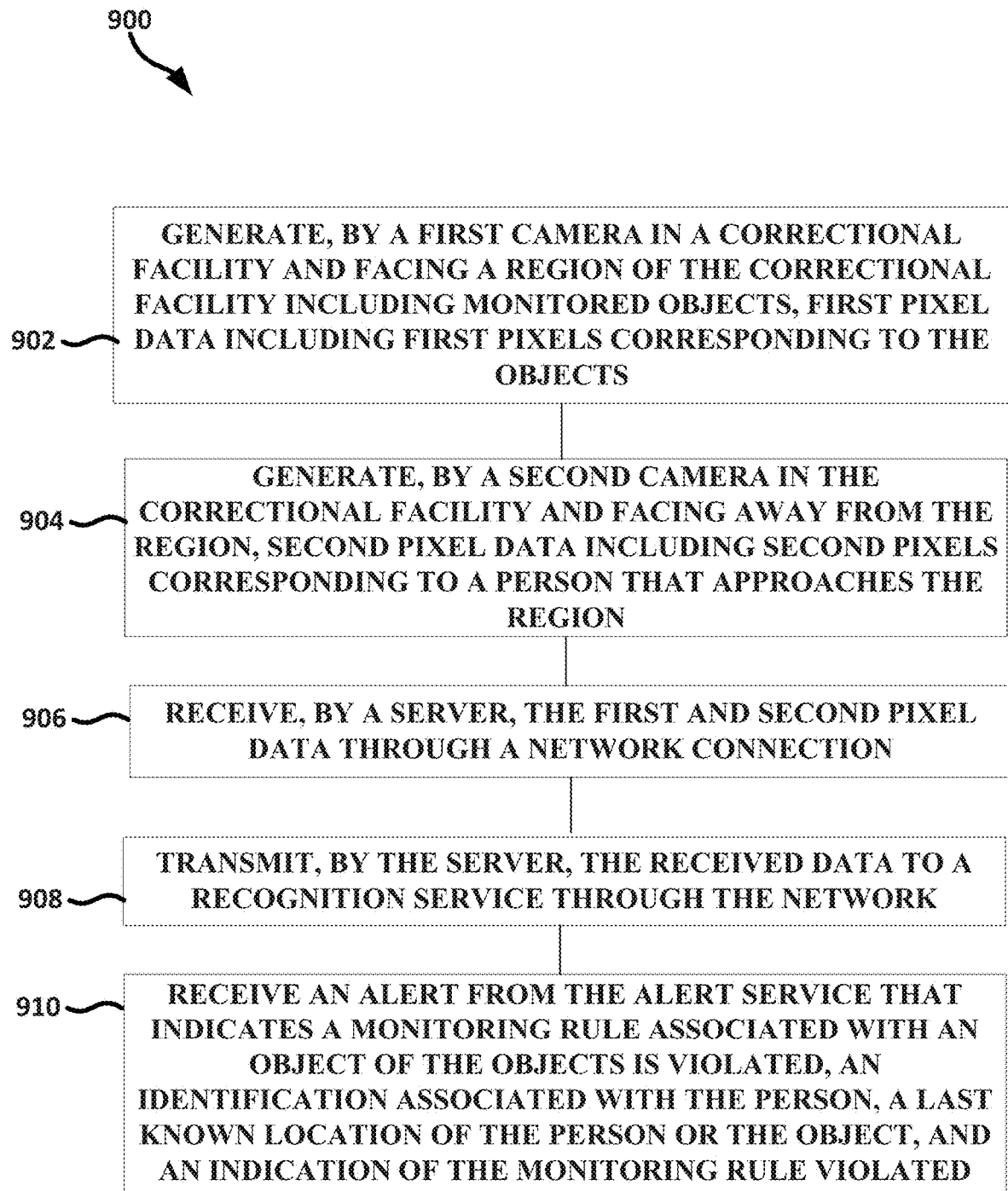
FIG. 9 illustrates a flow diagram of a technique for monitoring objects in a correctional facility, according to an example embodiment.

FIG. 9 illustrates a flow diagram of a technique 900 for monitoring objects in a correctional facility, according to an example embodiment. The technique 900 as illustrated includes generating, by a first camera in a correctional facility and facing a region of the correctional facility including monitored objects, first pixel data including first pixels corresponding to the objects, at operation 902; generating, by a second camera in the correctional facility and facing away from the region, second pixel data including second pixels corresponding to a person that approaches the region, at operation 904; receiving, by a server, the first and second pixel data through a network connection, at operation 906; transmitting, by the server, the received data to a recognition service through the network, at operation 908; and receiving an alert from the alert service that indicates a monitoring rule associated with an object of the objects is violated, an identification associated with the person, a last known location of the person or the object, and an indication of the monitoring rule violated, at operation 910.

The method 900 can further include, wherein the monitoring rule indicates that the object was not returned in a specified period of time from when it was taken. The method 900 can further include, wherein the monitoring rule indicates that the person is not authorized to take the object. The method 900 can further include, wherein the monitoring rule indicates that the object was modified between when it was taken and when it was returned. The method 900 can further include, receiving, by a server and from a device of correctional facility personnel, a list of objects expected in the region, and wherein the objects are each listed on the list of objects.

The method 900 can further include receiving, by the server and from a third camera in the correctional facility and including a third field of view of a location of the correctional facility in which the object is not permitted, third pixel data from the third camera through the network connection. The method 900 can further include transmitting the third pixel data to the recognition service through the network. The method 900 can further include, wherein the monitoring rule indicates the object was detected in the location.

The method 900 can further include receiving, from a device of correctional facility personnel, one or more images of each of the objects and corresponding classification labels. The method 900 can further include, wherein the alert includes an image of the object.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

AI is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for backpropagation may be used, such as stochastic gradient descent (SGD), Adam, etc.

The NN can be trained to detect a number of objects. The personnel of the correctional facility can provide the list of objects 348. For one or more objects in the list of objects 348, the personnel can provide one or more images and a classification for the object 104 in the image. The image and classification can then be used to train the NN to detect each of the objects. The NN can include a general object recognition NN. The training can include fine tuning the general object recognition NN to recognize the objects in the region 106.

Figure 10:
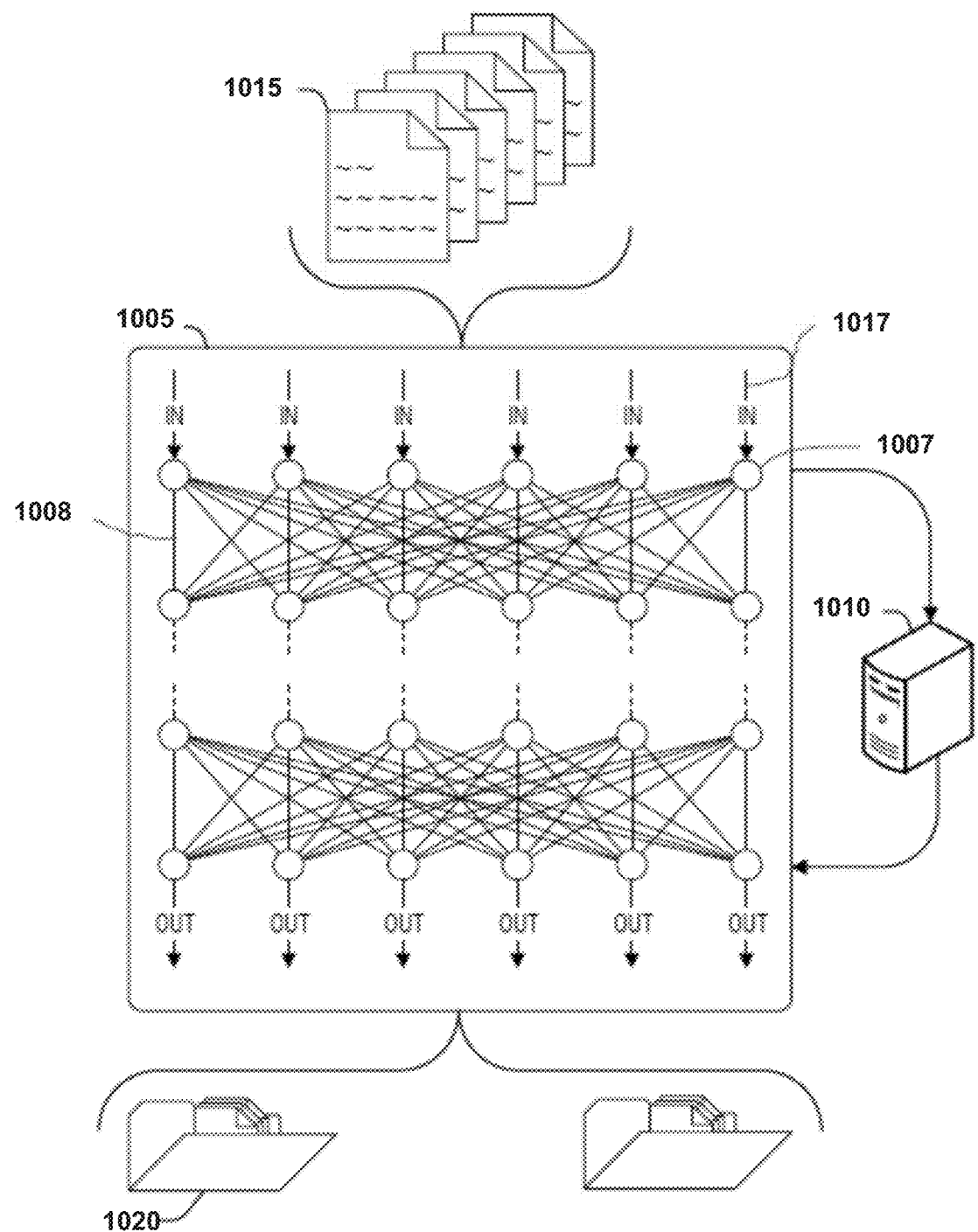
FIG. 10 is a block diagram of an example of an environment including a system for neural network training, according to an embodiment.

FIG. 10 is a block diagram of an example of an environment including a system for neural network training, according to an embodiment. The system includes an artificial NN (ANN) 1005 that is trained using a processing node 1010. The processing node 1010 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 1005, or even different nodes 1007 within layers. Thus, a set of processing nodes 1010 is arranged to perform the training of the ANN 1005.

The set of processing nodes 1010 is arranged to receive a training set 1015 for the ANN 1005. The ANN 1005 comprises a set of nodes 1007 arranged in layers (illustrated as rows of nodes 1007) and a set of inter-node weights 1008 (e.g., parameters) between nodes in the set of nodes. In an example, the training set 1015 is a subset of a complete training set. Here, the subset may enable processing nodes with limited storage resources to participate in training the ANN 1005.

The training data may include multiple numerical values representative of a domain, such as a word, symbol, other part of speech, or the like. Each value of the training or input 1017 to be classified once ANN 1005 is trained, is provided to a corresponding node 1007 in the first layer or input layer of ANN 1005. The values propagate through the layers and are changed by the objective function.

As noted above, the set of processing nodes is arranged to train the neural network to create a trained neural network. Once trained, data input into the ANN will produce valid classifications 1020 (e.g., the input data 1017 will be assigned into categories), for example. The training performed by the set of processing nodes 1007 is iterative. In an example, each iteration of the training the neural network is performed independently between layers of the ANN 1005. Thus, two distinct layers may be processed in parallel by different members of the set of processing nodes. In an example, different layers of the ANN 1005 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 1007 (e.g., neurons) are trained independently. In an example, the nodes are trained on different hardware.

Figure 11:
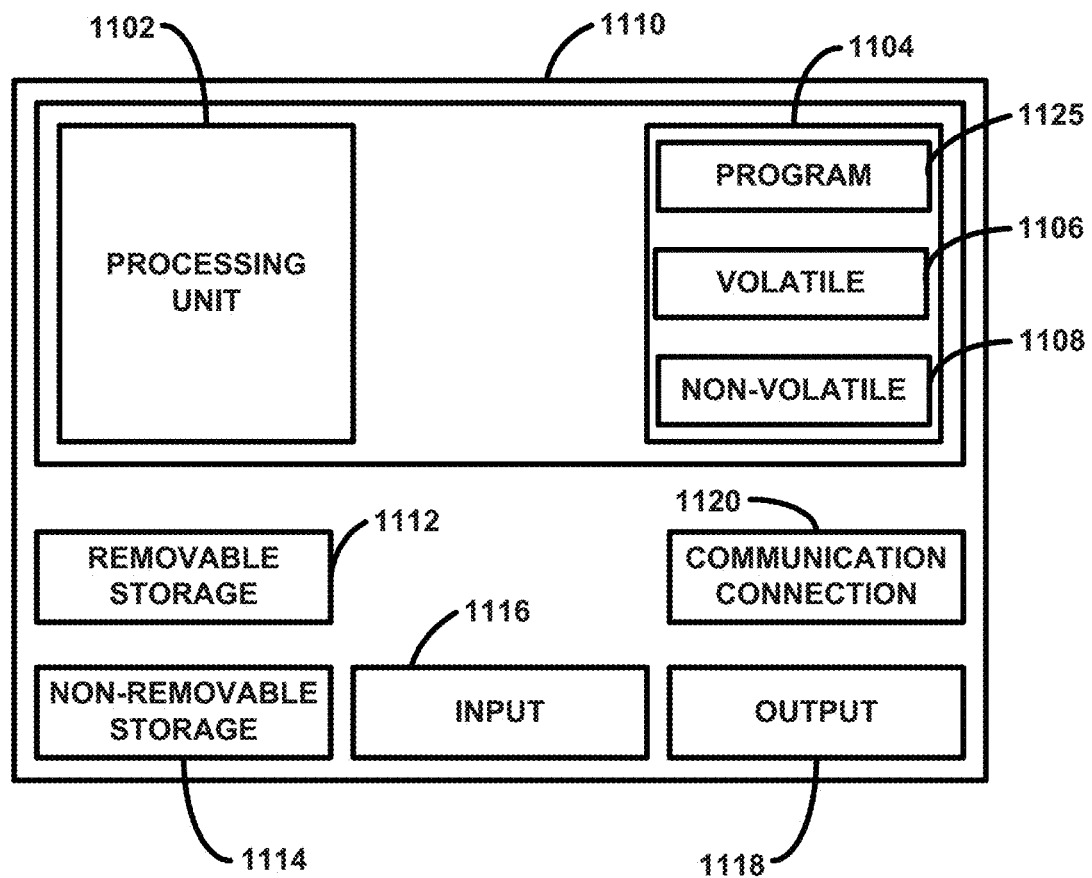
FIG. 11 is a block diagram of a computing device, according to an example embodiment.

FIG. 11 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 1110, may include a processing unit 1102, memory 1104, removable storage 1112, and non-removable storage 1114. Memory 1104 may include volatile memory 1106 and non-volatile memory 1108. Computer 1110 may include—or have access to a computing environment that includes—a variety of computer-readable media, such as volatile memory 1106 and non-volatile memory 1108, removable storage 1112 and non-removable storage 1114. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1110 may include or have access to a computing environment that includes input 1116, output 1118, and a communication connection 1120. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1102 of the computer 1110. A hard drive, CD-ROM, and RAM are some examples of articles including a non-transitory computer-readable medium. For example, a computer program 1125 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 1110 to provide generic access controls in a COM based computer network system having multiple users and servers.

The functions or algorithms described herein are implemented in hardware, software, or a combination of software and hardware in some embodiments. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely embodiments. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flows are applicable to software, firmware, and hardware implementations.

Systems and methods of the present disclosure may be implemented on a mobile device as a mobile application, web-based application, on a desktop computer as a computer application, or a combination thereof. A mobile application may operate on a Smartphone, tablet computer, portable digital assistant (PDA), ruggedized mobile computer, or other mobile device. The mobile device may be connected to the Internet or network via Wi-Fi, Wide Area Network (WAN), cellular connection, WiMax, or any other type of wired or wireless method of networking connection. In some embodiments, a web-based application may be delivered as a software-as-a-service (SaaS) package (e.g. cloud-based embodiments) accessible via a device app, a web browser application, or other suitable application, depending on the particular embodiment.

Additional Notes and Some Example Embodiments

Example 1 includes a system comprising a first camera in a correctional facility and facing a region of the correctional facility including monitored objects, the first camera configured to generate first pixel data including first pixels corresponding to the objects, a second camera in the correctional facility and facing away from the region, the second camera configured to generate second pixel data including second pixels corresponding to a person that approaches the region, and a server configured to receive the first and second pixel data through a network connection, transmit the received data to a recognition service through the network, and receive an alert from the alert service that indicates a monitoring rule associated with an object of the objects is violated, an identification associated with the person, a last known location of the person or the object, and an indication of the monitoring rule violated.

In Example 2, Example 1 can further include, wherein the monitoring rule indicates that the object was not returned in a specified period of time from when it was taken.

In Example 3, at least one of Examples 1-2 can further include, wherein the monitoring rule indicates that the person is not authorized to take the object.

In Example 4, at least one of Examples 1-3 can further include, wherein the monitoring rule indicates that the object was modified between when it was taken and when it was returned.

In Example 5, at least one of Examples 1-4 can further include, wherein the server is further configured to receive, from a device of correctional facility personnel, a list of objects expected in the region, and wherein the objects are each listed on the list of objects.

In Example 6, at least one of Examples 1-5 can further include a third camera in the correctional facility and including a third field of view of a location of the correctional facility in which the object is not permitted, wherein the server is further configured to receive third pixel data from the third camera through the network connection, transmit the third pixel data to the recognition service through the network, and wherein the monitoring rule indicates the object was detected in the location.

In Example 7, at least one of Examples 1-6 can further include, wherein the server is further configured to receive, from a device of correctional facility personnel, one or more images of each of the objects and corresponding classification labels.

In Example 8, at least one of Examples 1-7 can further include, wherein the alert includes an image of the object.

Example 9 includes a method of performing the operations of the system of at least one of Examples 1-8.

Example 10 includes a non-transitory machine-readable medium including instructions that, when executed by a machine, cause the machine to perform operations of the method of Example 9.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
a first camera in a correctional facility and facing a region of the correctional facility including monitored objects, the first camera configured to generate first pixel data including first pixels corresponding to the objects;
a second camera in the correctional facility and facing away from the region, the second camera configured to generate second pixel data including second pixels corresponding to a person that approaches the region; and
a server configured to receive the first and second pixel data through a network connection, transmit the received data to a recognition service through the network, and receive an alert from an alert service that indicates a monitoring rule associated with an object of the objects is violated, an identification associated with the person, a last known location of the person or the object, and an indication of the monitoring rule violated.

2. The system of claim 1, wherein the monitoring rule indicates that the object was not returned in a specified period of time from when it was taken.

3. The system of claim 1, wherein the monitoring rule indicates that the person is not authorized to take the object.

4. The system of claim 1, wherein the monitoring rule indicates that the object was modified between when it was taken and when it was returned.

5. The system of claim 1, wherein the server is further configured to:
receive, from a device of correctional facility personnel, a list of objects expected in the region, and wherein the objects are each listed on the list of objects.

6. The system of claim 1, further comprising:
a third camera in the correctional facility and including a third field of view of a location of the correctional facility in which the object is not permitted;
wherein the server is further configured to receive third pixel data from the third camera through the network connection, transmit the third pixel data to the recognition service through the network; and
wherein the monitoring rule indicates the object was detected in the location.

7. The system of claim 1, wherein the server is further configured to:
receive, from a device of correctional facility personnel, one or more images of each of the objects and corresponding classification labels.

8. The system of claim 1, wherein the alert includes an image of the object.

9. A method comprising:
generating, with a first camera, first pixel data including first pixels corresponding to objects monitored in a region of a field of view of the first camera
generating second pixel data, with a second camera with a field of view facing away from the region, including second pixels corresponding to a person that approaches the region;
receiving first and second pixel data through a network by a server;
transmitting, by the server through the network, the received first and second pixel data to a recognition service; and
receiving an alert from an alert service indicating violation of a monitoring rule associated with a monitored object of the monitored objects and additional data associated with the alert including an identification associated with the person, a last know location of the person or the object, and an indication of the monitoring rule violated.

10. The method of claim 9, wherein the monitoring rule indicates that the object was not returned in a specified period of time from when it was taken.

11. The method of claim 9, wherein the monitoring rule indicates that the person is not authorized to take the object.

12. The method of claim 9, wherein the monitoring rule indicates that the object was modified between when it was taken and when it was returned.

13. The method of claim 9, further comprising:
receiving, from a device of correctional facility personnel, a list of objects expected in the region, and wherein the objects are each listed on the list of objects.

14. The method of claim 9, further comprising:
generating third pixel data, with a third camera with a field of view of a location in which the object is not permitted, including third pixels within which the object is present;
receiving third pixel data by the server from the third camera through the network;
transmitting the third pixel data to the recognition service through the network; and
wherein the monitoring rule indicates the object was detected in the location.

15. The method of claim 9, further comprising:
receiving, from a device of correctional facility personnel, one or more images of each of the objects and corresponding classification labels.

16. The method of claim 9, wherein the alert includes an image of the object.

17. A non-transitory computer-readable medium with instructions stored thereon that when executed by a computer processor cause a computing system to perform data processing activities comprising:
generating, with a first camera, first pixel data including first pixels corresponding to objects monitored in a region of a field of view of the first camera
generating second pixel data, with a second camera with a field of view facing away from the region, including second pixels corresponding to a person that approaches the region;
receiving first and second pixel data through a network by a server;
transmitting, by the server through the network, the received first and second pixel data to a recognition service; and
receiving an alert from an alert service indicating violation of a monitoring rule associated with a monitored object of the monitored objects and additional data associated with the alert including an identification associated with the person, a last know location of the person or the object, and an indication of the monitoring rule violated.

18. The non-transitory computer-readable medium of claim 17, wherein the monitoring rule indicates that the object was not returned in a specified period of time from when it was taken.

19. The non-transitory computer-readable medium of claim 17, wherein the monitoring rule indicates that the person is not authorized to take the object.

20. The non-transitory computer-readable medium of claim 17, wherein when the instructions are further executed by the computer processor further cause the computing system to perform data processing activities including:
   generating third pixel data, with a third camera with a field of view of a location in which the object is not permitted, including third pixels within which the object is present;
   receiving third pixel data by the server from the third camera through the network;
   transmitting the third pixel data to the recognition service through the network; and
   wherein the monitoring rule indicates the object was detected in the location.

* * * * *